(12) United States Patent
Cheng

(10) Patent No.: US 10,369,709 B1
(45) Date of Patent: Aug. 6, 2019

(54) FLEXIBLE SUCTION DEVICE, ROBOT SYSTEM AND METHOD USING THE SAME

(71) Applicants: Beijing Jingdong Shangke Information Technology Co., Ltd., Beijing (CN); JD.com American Technologies Corporation, Mountain View, CA (US)

(72) Inventor: Hui Cheng, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 0 days.

(21) Appl. No.: 16/137,705

(22) Filed: Sep. 21, 2018

(51) Int. Cl.
  *B25J 18/06* (2006.01)
  *B25J 15/06* (2006.01)
  *B25J 9/10* (2006.01)

(52) U.S. Cl.
  CPC .............. *B25J 18/06* (2013.01); *B25J 9/104* (2013.01); *B25J 15/0616* (2013.01); *B25J 15/0683* (2013.01)

(58) Field of Classification Search
  CPC . B25J 9/065; B25J 9/104; B25J 9/1045; B25J 15/0616; B25J 15/0683; B25J 18/06; B65B 35/18; B65G 47/244; B65G 47/248; Y10S 901/21
  USPC .......... 294/183, 65; 414/737, 758, 763, 783; 901/21
  See application file for complete search history.

(56) References Cited

U.S. PATENT DOCUMENTS

| | | | | |
|---|---|---|---|---|
| 4,065,001 A * | 12/1977 | Ohnaka | ..................... | B25J 3/02 414/700 |
| 4,266,905 A * | 5/1981 | Birk | ................... | B65G 47/1485 221/211 |
| 4,784,042 A * | 11/1988 | Paynter | .................... | B25J 9/142 414/7 |
| 4,846,625 A * | 7/1989 | Gabillet | .............. | B65G 49/068 414/737 |
| 5,059,086 A * | 10/1991 | Thierion | ................ | B65G 61/00 414/626 |
| 5,174,168 A * | 12/1992 | Takagi | ..................... | B25J 9/104 74/109 |
| 5,317,952 A * | 6/1994 | Immega | ................... | B25J 9/104 74/490.04 |
| 7,284,318 B2 * | 10/2007 | Hartmann | ......... | H01L 21/67144 29/739 |

(Continued)

*Primary Examiner* — Dean J Kramer
(74) *Attorney, Agent, or Firm* — China Science Patent & Trademark US LLC; Shanyun Lu

(57) ABSTRACT

A flexible suction device and a robot system using the same are provided. The flexible suction device includes a flexible tube portion, and a suction cup connected to one end of the flexible tube portion, such that the suction cup may grasp an object by a suction force. The flexible tube portion is controllable to switch between a straight state and at least one bending state, such that the flexible tube portion is configured to bend from the straight state to the at least one bending state in order to swing and flip the object being grasped by the suction cup. In operation, the flexible suction device is controlled to grasp and lift the object in the straight state, and then switch to the bending state in order to swing the object being grasped. Thus, the flexible suction device may release the object, such that the object is flipped.

15 Claims, 12 Drawing Sheets

(56) References Cited

U.S. PATENT DOCUMENTS

| | | | |
|---|---|---|---|
| 8,126,591 B2* | 2/2012 | Buckingham | B25J 9/06 700/245 |
| 9,004,846 B2* | 4/2015 | La Rovere | B25J 15/0616 294/65 |
| 2015/0343649 A1* | 12/2015 | Galinson | B25J 18/06 414/729 |
| 2018/0243900 A1* | 8/2018 | Tanaka | B25J 9/065 |

* cited by examiner

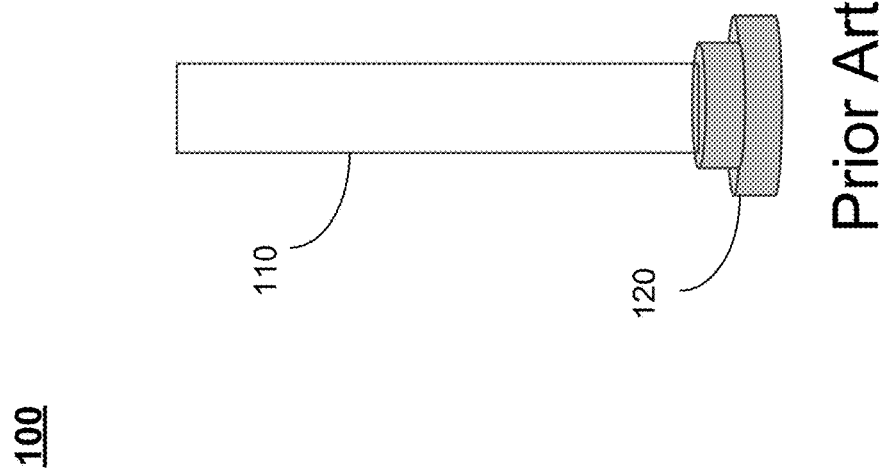

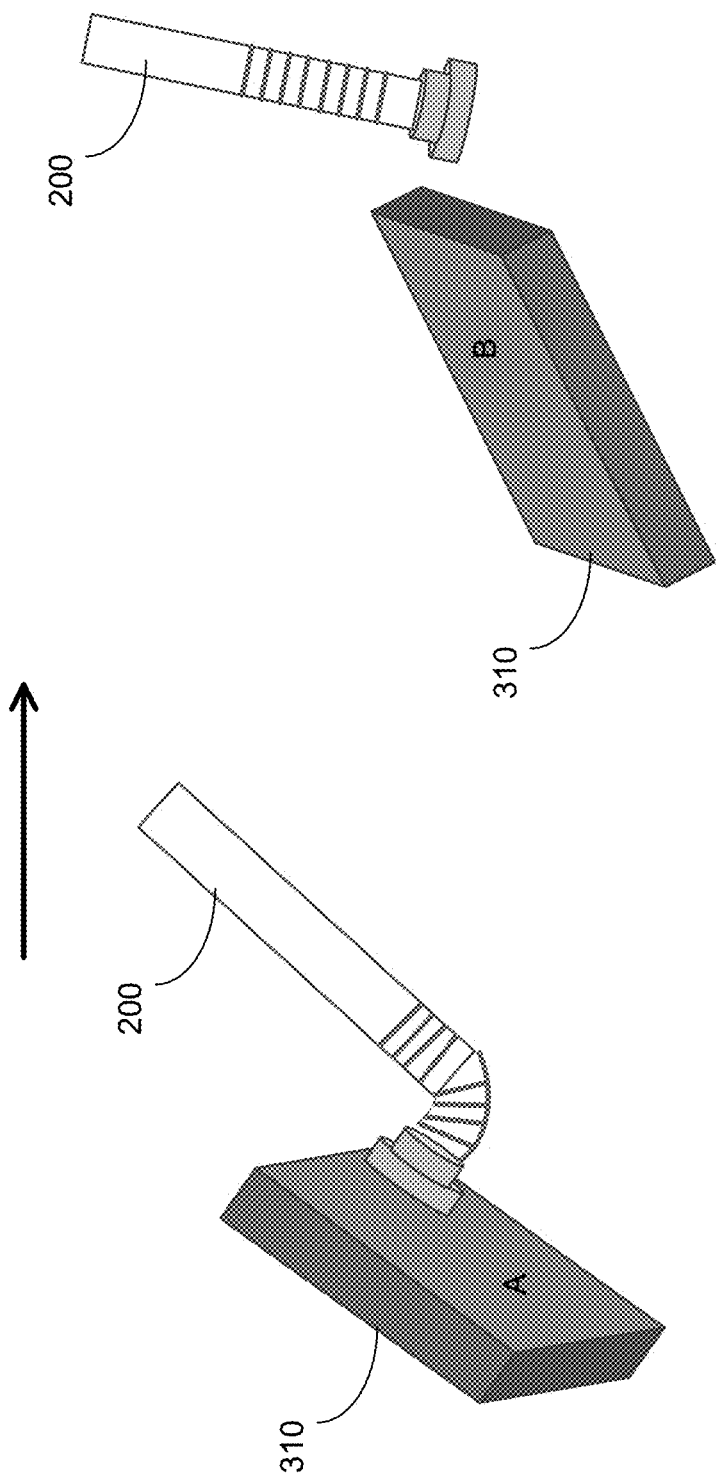

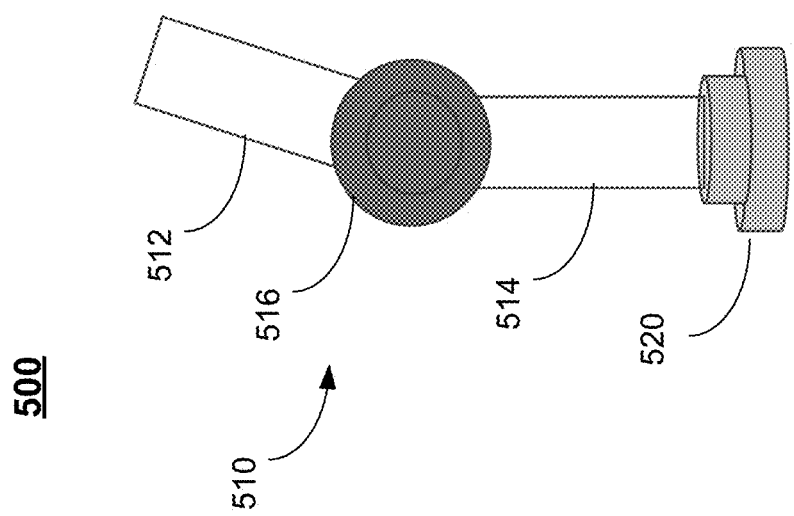

US 10,369,709 B1

FLEXIBLE SUCTION DEVICE, ROBOT SYSTEM AND METHOD USING THE SAME

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The present invention relates generally to robot technology, and more particularly to a flexible suction device, a robot system using the same, and a method using the same.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Grasping is an important way for robots to interact with objects. Besides grasping objects using fingers like robotic hands, suction cups are also used. In particular, when there is a large enough smooth surface on an object, suction is an effective and efficient way to manipulate an object.

For example, FIG. 1 shows a conventional suction device 100, which includes a rigid tube 110 connected to a suction cup 120 at its end. The kind of design of the conventional suction device 100 is easy to manufacture and is effective when the objective is to lift an object up and move it to another location. However, when the weight of the object is not distributed evenly and/or the object is heavy, it is likely that the suction cup will peel off and results in a failure in picking the object.

In addition, when using the conventional rigid suction device 100, the ways that an object can be manipulated is quite limited. It is best for lifting an object, move it to another location in the same pose and then set it down. It is almost impossible to flip or turn an object upside down using a rigid suction device 100.

Therefore, there is a need to address the aforementioned deficiencies and inadequacies in the art.

SUMMARY OF THE INVENTION

One aspect of the invention relates to a flexible suction device used in a robot system. The flexible suction device includes a flexible tube portion; and a suction cup connected to one end of the flexible tube portion, and configured to grasp an object by a suction force. The flexible tube portion is switchable between a straight state and at least one bending state, such that the flexible tube portion is configured to bend from the straight state to the at least one bending state in order to swing and flip the object being grasped by the suction cup. In certain embodiments, the bending of the flexible suction device may be controlled by the mass of the object and/or the operations such as the acceleration and speed of the flexible suction device. In other embodiments, the bending of the flexible suction device may be controlled by control devices, which support the flexible suction device to maintain in a desired bending condition or changes the bending conditions of the flexible suction device. In one embodiments, the control devices are strings located in the periphery of the flexible tube portion.

Another aspect of the invention relates to a flexible suction device used in a robot system. The robot system includes a controller; and a plurality of flexible suction devices each being configured to grasp an object. Each of the flexible suction devices includes a flexible tube portion; and a suction cup connected to one end of the flexible tube portion, and configured to grasp the object by a suction force. The flexible tube portion is switchable between a straight state and at least one bending state, such that the controller is configured to control the flexible tube portion to bend in the at least one bending state in order to swing and flip the object being grasped by the suction cup.

In certain embodiments, the controller includes a processor; and a storage device storing computer executable code. The controller is configured to execute the computer executable code at the processor to perform: controlling one of the flexible suction devices to grasp the object by the suction force or to release the object being grasped; controlling one of the flexible suction devices to switch to the straight state; controlling one of the flexible suction devices to switch to the at least one bending state; and controlling one of the flexible suction devices to move.

In certain embodiments, the controller is configured to flip the object by: controlling one of the flexible suction devices in the straight state to grasp the object by the suction force; controlling the flexible suction device to lift the object being grasped; controlling the flexible suction device to switch from the straight state to the at least one bending state in order to swing the object being grasped; and controlling the flexible suction device in the at least one bending state to release the object being grasped, such that the object is flipped.

In certain embodiments, when the flexible suction device is in the straight state, a vertical projection of a center of mass of the object is located on a bottom surface of the object, and when the flexible suction device is switched to the at least one bending state, the vertical projection of the center of mass of the object is located on a different surface from the bottom surface of the object, such that the object is flipped when the flexible suction device releases the object.

A further aspect of the invention relates to a method of flipping an object using a robot system, which includes: providing a flexible suction device to the robot system, where the flexible suction device includes: a flexible tube portion; and a suction cup connected to one end of the flexible tube portion, and configured to grasp the object by a suction force, wherein the flexible tube portion is switchable between a straight state and at least one bending state; controlling the flexible suction device in the straight state to grasp the object by the suction force; controlling the flexible suction device to lift the object being grasped; controlling the flexible suction device to switch from the straight state to the at least one bending state in order to swing the object being grasped; and controlling the flexible suction device in the at least one bending state to release the object being grasped, such that the object is flipped.

In certain embodiments, the flexible tube portion includes a plurality of flexible sections flexibly connected to one another; and control devices such as a plurality of strings, each penetrating a periphery of the flexible sections to control the flexible sections to switch between the straight state and the at least one bending state.

In certain embodiments, an end of each of the strings is fixed to the suction cup.

In certain embodiments, each of the flexible sections is a ring structure having a plurality of holes at the periphery thereof, and each of the strings penetrates through a corresponding one of the holes.

In certain embodiments, the flexible tube portion includes: a plurality of sections; and at least one joint structure connecting the plurality of sections to control one of the sections to rotate relatively to another of the sections.

In certain embodiments, the robot system includes a controller, and the controller includes a processor; and a storage device storing computer executable code. The controller is configured to execute the computer executable code at the processor to perform: controlling one of the flexible suction devices to grasp the object by the suction force or to release the object being grasped; controlling one of the flexible suction devices to switch to the straight state; controlling one of the flexible suction devices to switch to the at least one bending state; and controlling one of the flexible suction devices to move.

In certain embodiments, when the flexible suction device is in the straight state, a vertical projection of a center of mass of the object is located on a bottom surface of the object, and when the flexible suction device is switched to the at least one bending state, the vertical projection of the center of mass of the object is located on a different surface from the bottom surface of the object, such that the object is flipped when the flexible suction device releases the object.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a schematic view of a suction device according to the related art.

FIG. 3E is a schematic view of the flexible suction device as shown in FIG. 3C further swinging the object being grasped.

FIG. 3F is a schematic view of the flexible suction device as shown in FIG. 3D releasing the object being grasped.

FIG. 5 is a schematic view of a flexible suction device according to another embodiment of the present invention.

DETAILED DESCRIPTION OF THE INVENTION

Figure 2B:
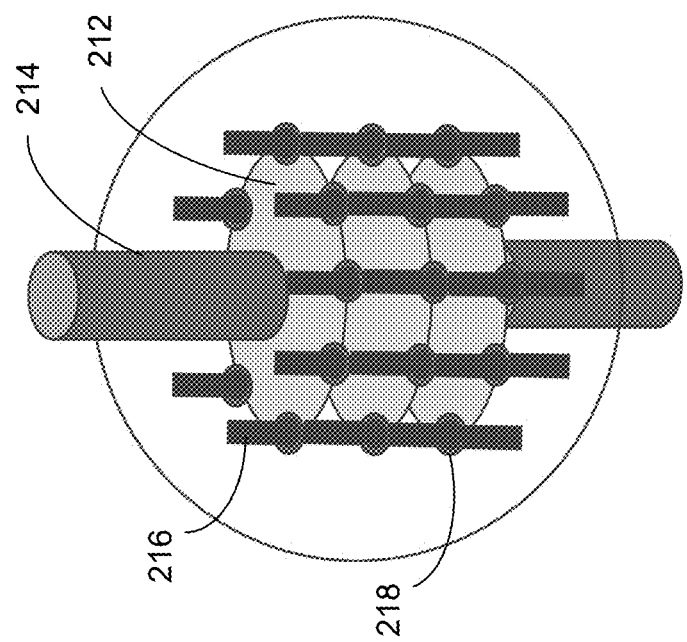
FIG. 2B is a partially enlarged view of the flexible tube portion of the flexible suction device as shown in FIG. 2A.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The description will be made as to the embodiments of the present invention in conjunction with the accompanying drawings. In accordance with the purposes of this invention, as embodied and broadly described herein, this invention, in certain aspects, relates to a flexible suction device, a robot system using the same, and a method of flipping an object using the same.

As discussed above, when the conventional rigid suction device 100 as shown in FIG. 1 is used to grasp an object, the suction cup should be applied to align to the center of mass of the object. Since center of mass of an arbitrary object is difficult to compute, especially using a computation vision system, the geometric center of the object is often used instead of the true center of mass. When the true center of mass is close to the geometric center of the object or the object is light compared to the force applied by the suction cup, the object can be securely lifted and moved. However, the conventional suction device 100 may not work well when the weight of the object is not distributed evenly and/or the object is heavy. In certain embodiments, for many logistic operations, the object being grasped may be a package, which may be loosely wrapped in a plastic bag so that the center of mass can move depending on how the package is picked up if using a suction cup. In this case, the location for grasping (or suctioning) the object may be determined by the center of mass of the object or package. Moreover, for sorting and other purpose, a package may need to be turned over if its label does not face up. However, it is difficult and almost impossible to flip or turn an object upside down using a rigid suction cup.

Figure 2A:
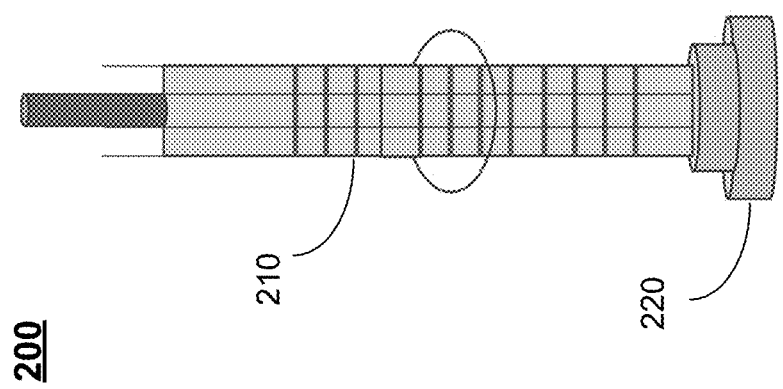
FIG. 2A is a schematic view of a flexible suction device according to one embodiment of the present invention, where a flexible tube portion of the flexible suction device is in a straight state.
Figure 2C:
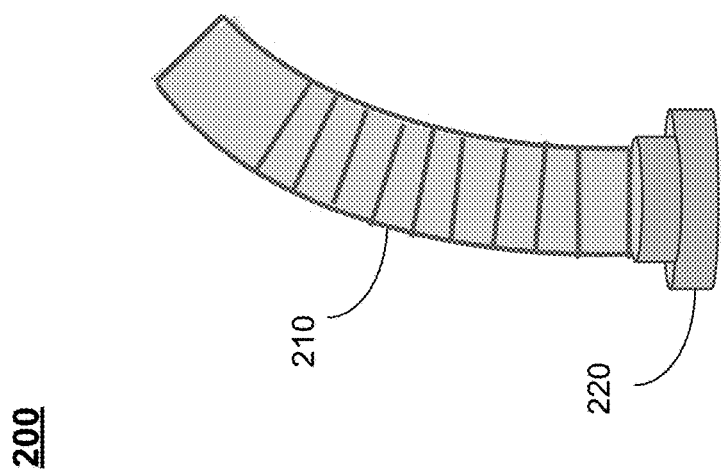
FIG. 2C is a schematic view of the flexible suction device as shown in FIG. 2A, where the flexible tube portion of the flexible suction device is in a bending state.

To address such deficiency, one aspect of the present invention is directed to a flexible suction device. One example of the flexible suction device is shown in FIGS. 2A-2C. Specifically, FIG. 2A is a schematic view of a flexible suction device according to one embodiment of the present invention, where a flexible tube portion of the flexible suction device is in a straight state (which is generally a default state of the flexible suction device). FIG. 2B is a partially enlarged view of the flexible tube portion of the flexible suction device as shown in FIG. 2A. FIG. 2C is a schematic view of the flexible suction device as shown in FIG. 2A, where the flexible tube portion of the flexible suction device is in a bending state. As shown in FIG. 2A, the flexible suction device 200 includes a flexible tube portion 210 and a suction cup 220. The suction cup 220 is connected to a bottom end of the flexible tube portion 210. The difference between the flexible suction device 200 and the conventional rigid suction device 100 as shown in FIG. 1 exists in that the flexible tube portion 210 is flexible and can bend. Specifically, the flexible tube portion 210 is controllable by a robot system to switch between a straight state (as shown in FIG. 2A) and one or more bending state (such as the bending state shown in FIG. 2C), such that the flexible tube portion 210 may bend from the straight state to the at least one bending state in order to swing and flip an object being grasped by the suction cup 220. The flexibility of the flexible tube portion 210 may be controlled case-by-case. In certain embodiments, the suction force is generated by forming a vacuum or a low pressure inside the suction cup 220 generated through a compressor connected through the flexible tube portion 210 shown in FIG. 2B.

In certain embodiments, the straight state and the bending states of the flexible suction device 200 may be a defined state controlled by control devices such as strips. In other embodiments, the control devices may be in a relaxed condition such that the flexible suction device 200 is in a flexible state without constraint from the control devices. Under this flexible state, the bending of the flexible suction device 200 may be affected by the object to be operated and the operation parameters of the flexible suction device 200. For example, when the flexible suction device 200 under the flexible state is attached to a surface of an object by vacuum, and the attaching location is not the center of the object, then the flexible suction device 200 would be bent while lifting the object up due to the center of mass of the object. Further, if the flexible suction device 200 is moving at a high speed, it would also be bend due to its the inertia to the moving operation. The bending of the flexible suction device 200 under the flexible state thus is not controlled by the active operation of the control devices, but is a passive action due to the mass distribution of the object and the moving speed, moving acceleration and moving direction.

In certain embodiments, the straight state and the bending states may cover both the active controlled straight condition/bending conditions and the passive controlled straight condition/bending condition. In other words, when the flexible suction device 200 is in a straight state, the straight state may be controlled by the control devices such as strings or may be simply controlled by the gravity of the flexible suction device 200 where the flexible suction device 200 is relaxed. Similarly, when the flexible suction device 200 is in a bending state, the bending state may be controlled by the control devices such as strings or may be simply controlled by the mass distribution of the object, the moving speed, acceleration, and moving angles defined by the robotic arm connected with the flexible suction device 200, where the flexible suction device 200 is relaxed.

As shown in FIG. 2B, the flexible tube portion 210 includes a plurality of flexible sections 212 flexibly connected to one another, a semi-rigid tube 214 passing the middle of the flexible sections 212 for air to flow through, and a plurality of strings 216 each penetrating a periphery of the flexible sections 212, such that the strings 216 may be used to control the flexible sections 212 to switch between the straight state and the at least one bending state. In certain embodiments, the strings 216 may be wires inside the walls of the flexible sections 212, and a bottom end of each of the strings 216 may be fixed to the suction cup 220. As shown in FIG. 2B, each of the flexible sections 212 may be a ring structure having one center hole for holding the semi-rigid tube 214, and the semi-rigid tube 214 is movable in the center holes of the flexible sections 212. The flexible sections 212 shown in FIG. 2B are independent plates. In certain embodiments, the flexible sections 212 are connected for example from the periphery, and the formed flexible sections 212 is then a tube-shaped structure equipped with plates inside the tube, and each plate has a center hole. As shown in FIT. 2B, each of the flexible sections 212 may be a ring structure having a plurality of holes 218 at the periphery thereof. In this case, each of the strings 216 may penetrate through a corresponding one of the holes 218 in order to control the flexible tube portion 210 by the forces applied to the strings 216. For example, when the flexible suction device 200 is in the straight state as shown in FIG. 2A, the rigidity of the flexible tube portion 210 may be controlled by the uniform forces applied to all of the strings 216. When the flexible suction device 200 is to be switched to the bending state as shown in FIG. 2C, the flexible tube portion 210 may be controlled to bend in different angles and/or shapes by applying different forces applied to each of the strings 216. In certain embodiments, the materials of the flexible sections 212 and the strings 216 may be determined based on the need, such that the flexible sections 212 and the strings 216 are not easily damaged during the operations. In other embodiments, the holes 218 may be located inside or outside the walls of the flexible sections 212. Under this situation, the strings 216 are located inside or outside the walls of the flexible sections 212 instead of sleeved inside the walls of the flexible sections 212.

Using the flexible suction device 200 as shown in FIGS. 2A-2C, the angle and the shape of the flexible tube portion 210 can change to switch into different bending states. For example, the flexible tube portion 210 may be controlled to bend according to the true center of mass of the object being grasped in order to achieve a suction relatively uniformly distributed around the suction cup 220. In this case, the chance of the suction cut 220 peeling off from the object may be greatly reduced. Further, the dimensions of the flexible suction device 200 and the components thereof (e.g., the flexible tube portion 210 and the suction cup 220) may vary depending on the case where the size, weight and other features the object to be grasped is defined. A designer of the flexible suction device 200 may optimize the features of the flexible suction device 200 based on the practical need.

Figure 3B:
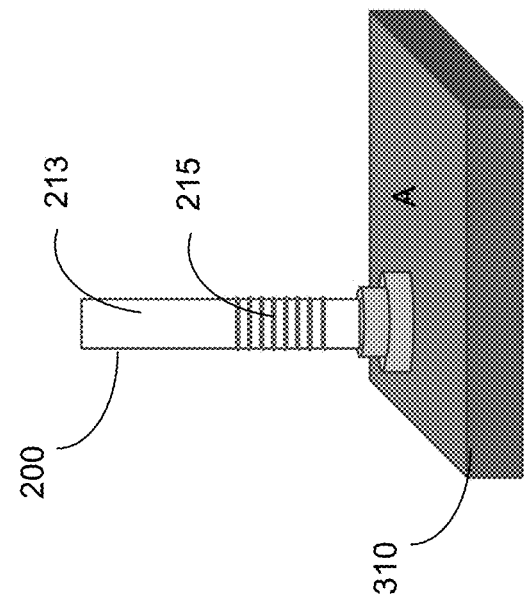
FIG. 3B is a schematic view of the flexible suction device grasping the object in FIG. 3A.
Figure 3A:
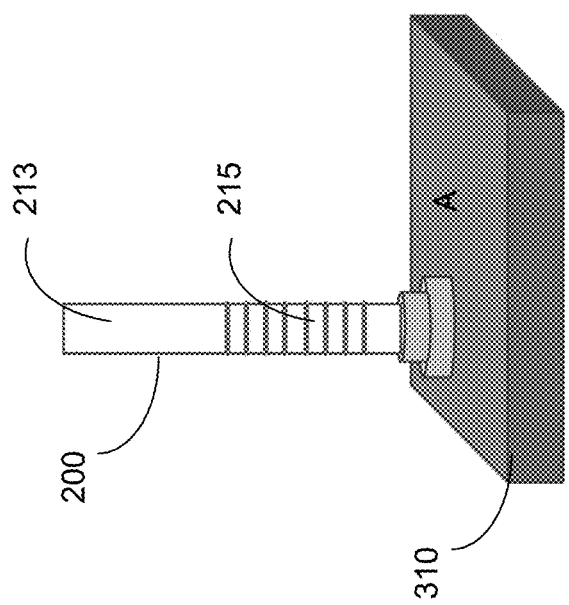
FIG. 3A is a schematic view of a flexible suction device and an object according to one embodiment of the present invention.

In certain embodiments, the flexible suction device 200 can be applied to a side or a corner of an object in order to swing and flip the object. For example, FIGS. 3A-3F show schematic views of the flexible suction device flipping an object upside down. Here three states of the flexible suction device 200 are defined, a straight state where the flexible suction device 200 is controlled by the control devices, such as strings, to be straight; a plurality of bending states, where the flexible suction device 200 is controlled by the control device to bend in a desired angle; and a flexible state, where the control device is relaxed and doesn't constrain the flexible suction device 200, and the flexible suction device 200 is free to bend by the gravity of the flexible suction device, the gravity of the object, and the acceleration and speed of the operation. In certain embodiments, if only flexible state is required, the flexible suction device 200 may not include the control devices such as strings, as long as part of the section device 200 is flexible. In certain embodiments, as shown in FIG. 3A, the flexible suction device 200 includes a rigid portion 213 that will not deform or bend, and a flexible portion 215 that is bendable and can be compressed. The flexible portion 215 then can be in an extended situation or a compressed situation.

Figure 3D:
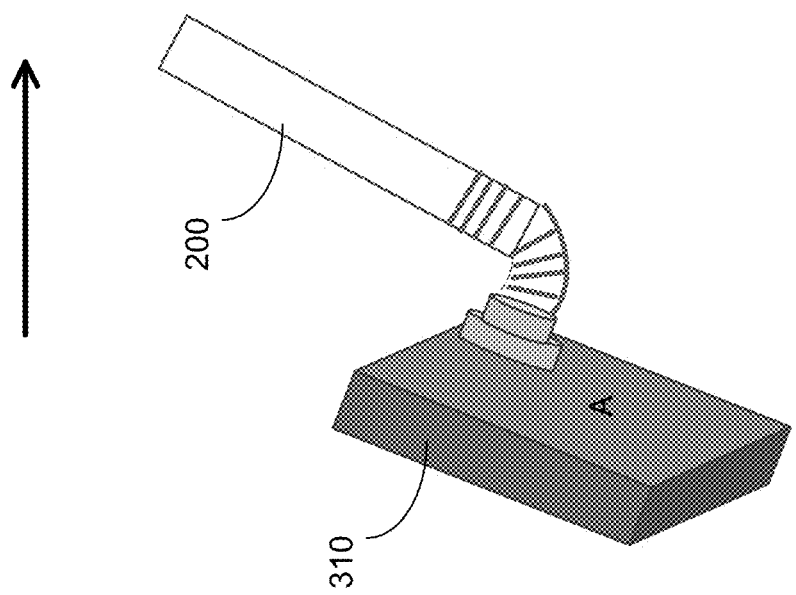
FIG. 3D is a schematic view of the flexible suction device as shown in FIG. 3B swinging the object being grasped.
Figure 3C:
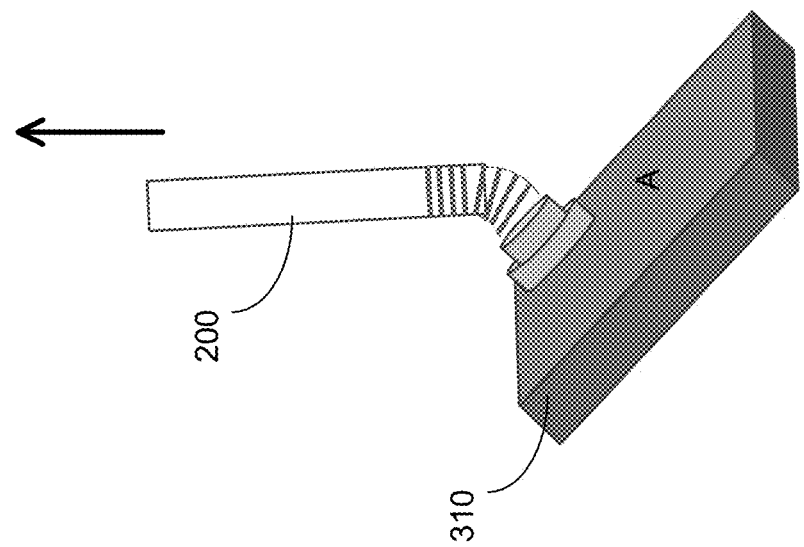
FIG. 3C is a schematic view of the flexible suction device as shown in FIG. 3A lifting the object being grasped and bending at the same time.

In this case, at the beginning as shown in FIG. 3A, the flexible suction device 200 is in the flexible state without any constraint, and stays along a vertical direction due to its mass. The flexible portion 215 is in the extended situation. An object 310 is provided with a top surface A and a bottom surface B, and suppose a center of mass of the object 310 is located in the geometric center of the object 310. Once the flexible suction device 200 is placed on the left side of the top surface A and vacuum is applied, as shown in FIG. 3B, the flexible portion 215 of the flexible suction device is compressed by the suction force, and the flexible suction device 200 firmly grasps the object 310. Then the flexible suction device 200 may lift the object 310 upward from the ground. During the lifting of the object 310, as shown in FIG. 3C, due to the difference between the suction cup attaching site and the center of the mass of the object 310, the flexible suction device 200 is bent, such that tight grasp of the object 310 is ensured. As shown in FIGS. 3D, and 3E, once the object 310 is lifted and moved rightward, the flexible suction device 200 may have different bending angles in response to the gravity of the object 310 and the moving force (acceleration and speed of moving) applied to the flexible suction device 200, such that the flexible suction device 200 performs swinging to the object 310. As shown in FIG. 3F, when the flexible suction device 200 releases the object 310, the object 310 is flipped over.

Figure 4B:
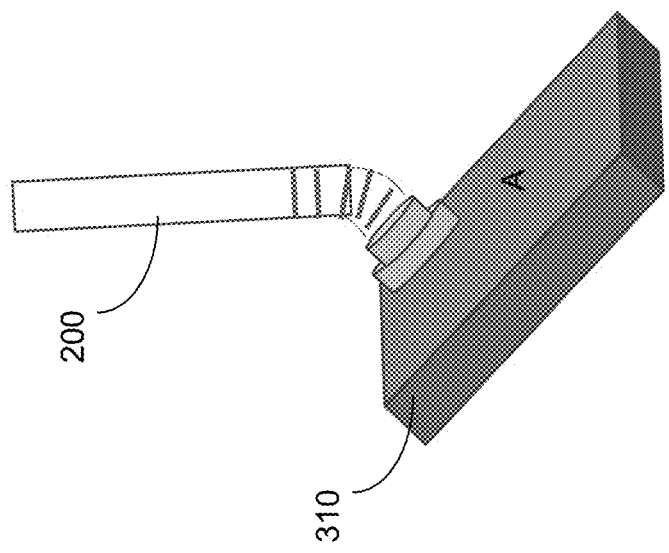
FIG. 4B is a schematic view of the flexible suction device as shown in FIG. 4A bending and lifting the object being grasped.
Figure 4A:
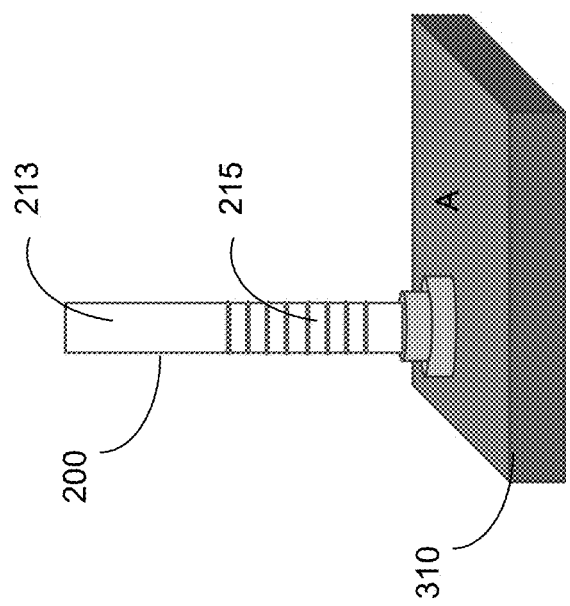
FIG. 4A is a schematic view of a flexible suction device grasping an object according to one embodiment of the present invention.
Figure 4D:
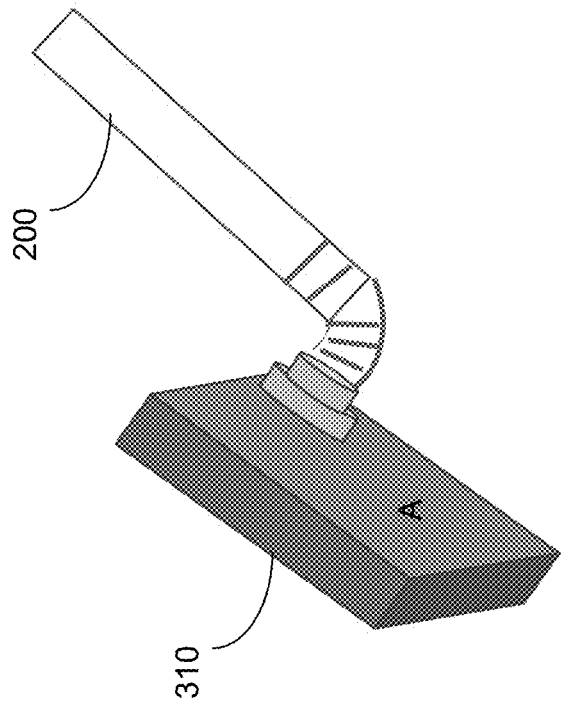
FIG. 4D is a schematic view of the flexible suction device as shown in FIG. 4C further swinging the object being grasped.
Figure 4C:
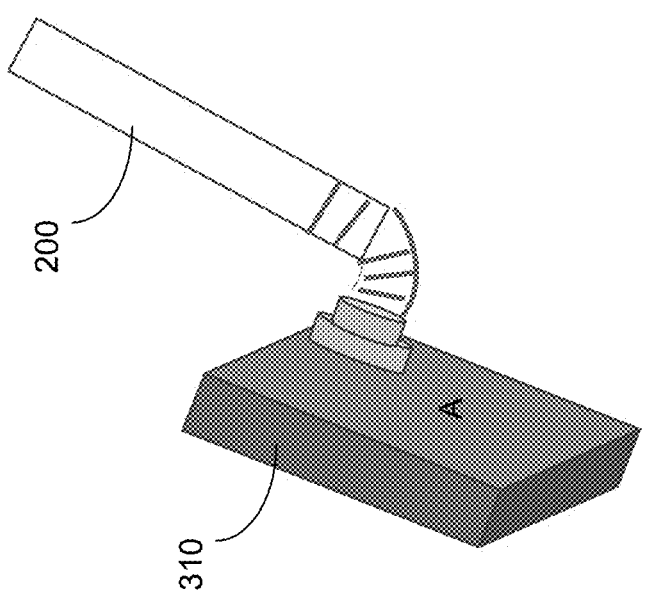
FIG. 4C is a schematic view of the flexible suction device as shown in FIG. 4B swinging the object being grasped.
Figure 4E:
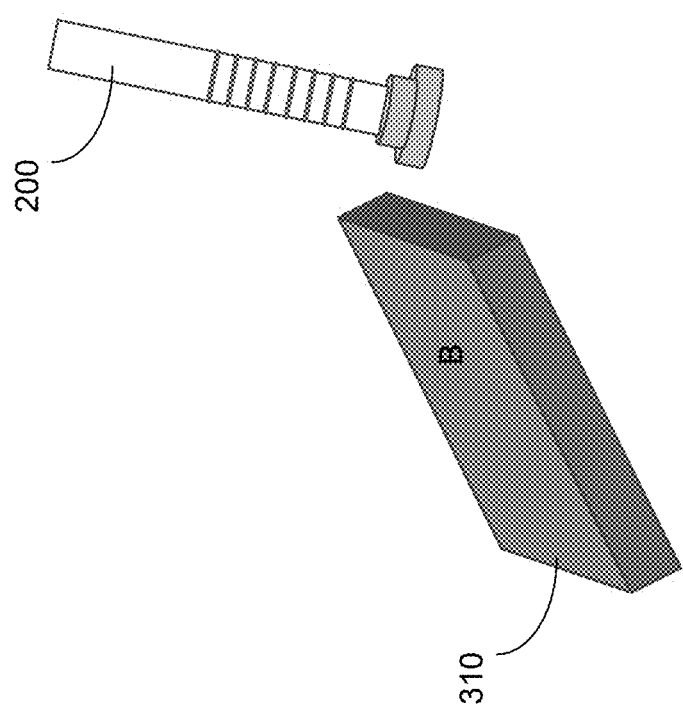
FIG. 4E is a schematic view of the flexible suction device as shown in FIG. 4D releasing the object being grasped.

In certain embodiments, the flexible suction device 200 can be applied to a side or a corner of an object in order to swing and flip the object. For example, FIGS. 4A-4E shows schematic views of the flexible suction device flipping an object upside down. The difference between the embodiment shown FIGS. 4A-4E and the embodiment shown in FIGS. 3A-3F is that, instead of or in addition to controlling bending by mass of object and operation parameters, as shown in FIGS. 4A-4E, control devices such as strings are used to control the bending of the flexible suction device. As shown in FIG. 4A, the flexible suction device 200 is controlled to be in the straight state, and is used to grasp the object 310 by a suction force. In this case, since the flexible suction device 200 is in the straight state, a vertical projection of a center of mass of the object 310 is located on a bottom surface of the object 310. Once the flexible suction device 200 is firmly grasping the object 310, the flexible suction device 200 may lift the object 310. As shown in FIG. 4B, the flexible suction device 200 may be controlled to bend and switched to a bending state, such that the object 310 being grasped is lifted. It should be noted that the flexible suction device 200 may lift the object 310 either by bending or by moving directly upward, or by a combination of bending and moving upward, based on different size, weight and other geographic features of the object 310. As shown in FIGS. 4C and 4D, once the object 310 is lifted, the flexible suction device 200 may be further controlled to switch between different bending states (i.e., different bending angles) such that the flexible suction device 200 performs swinging to the object 310. In this case, since the flexible suction device 200 is switched to the bending state, the vertical projection of the center of mass of the object 310 may be located on a different surface from the original bottom surface of the object 310, such that the object 310 can be flipped when the flexible suction device 200 releases the object 310. For example, as shown in FIG. 4D, the object 310 is in a position which is almost upside-down. When the object 310 swings to such a desired position, as shown in FIG. 4E, the flexible suction device 200 may be controlled to release the object 310. In this case, the released object 310 is flipped. Meanwhile, the flexible suction device 200 may be controlled to switch back to the straight state. In certain embodiments, the operation of the flexible suction device 200 may not start from the straight state as shown in FIG. 4A. Instead, the operation of the flexible suction device 200 may start from any one of the straight or bending states, and move to another one of the straight or bending states. For example, if the object 310 is currently in a tilted pose, the flexible suction device 200 can be operated in a bending state that matches the state of the tilted object 310, for example, make the suction cup 220 perpendicular to the targeted surface of the tilted object 310, so as to obtain an optimal grasping of the tilted object 310. Then the flexible suction device 200 is configured to move or rotate the tilted object 310 according to the purpose of the operation.

It should be noted that the structure of the flexible suction device is not limited to the structure as shown in FIGS. 2A-2C. For example, FIG. 5 is a schematic view of a flexible suction device according to another embodiment of the present invention. As shown in FIG. 5, the flexible tube portion 510 includes two sections 512 and 514, and a joint structure 516 is provided to connect the sections 512 and 514, such that one section 514 may rotate relatively to another section 512. In this case, the flexible tube portion 510 may also be switchable between a straight state and a bending state. In certain embodiments, the joint structure 516 actively controls the bending angles of the flexible suction device 500. In other embodiments, the joint structure 516 is passively bend due to the mass distribution of the object to be picked up, moving speed and acceleration, and moving angles. The moving speed, acceleration and moving angles may be controlled through a robotic arm that is connected through top end of the section 512.

Figure 6:
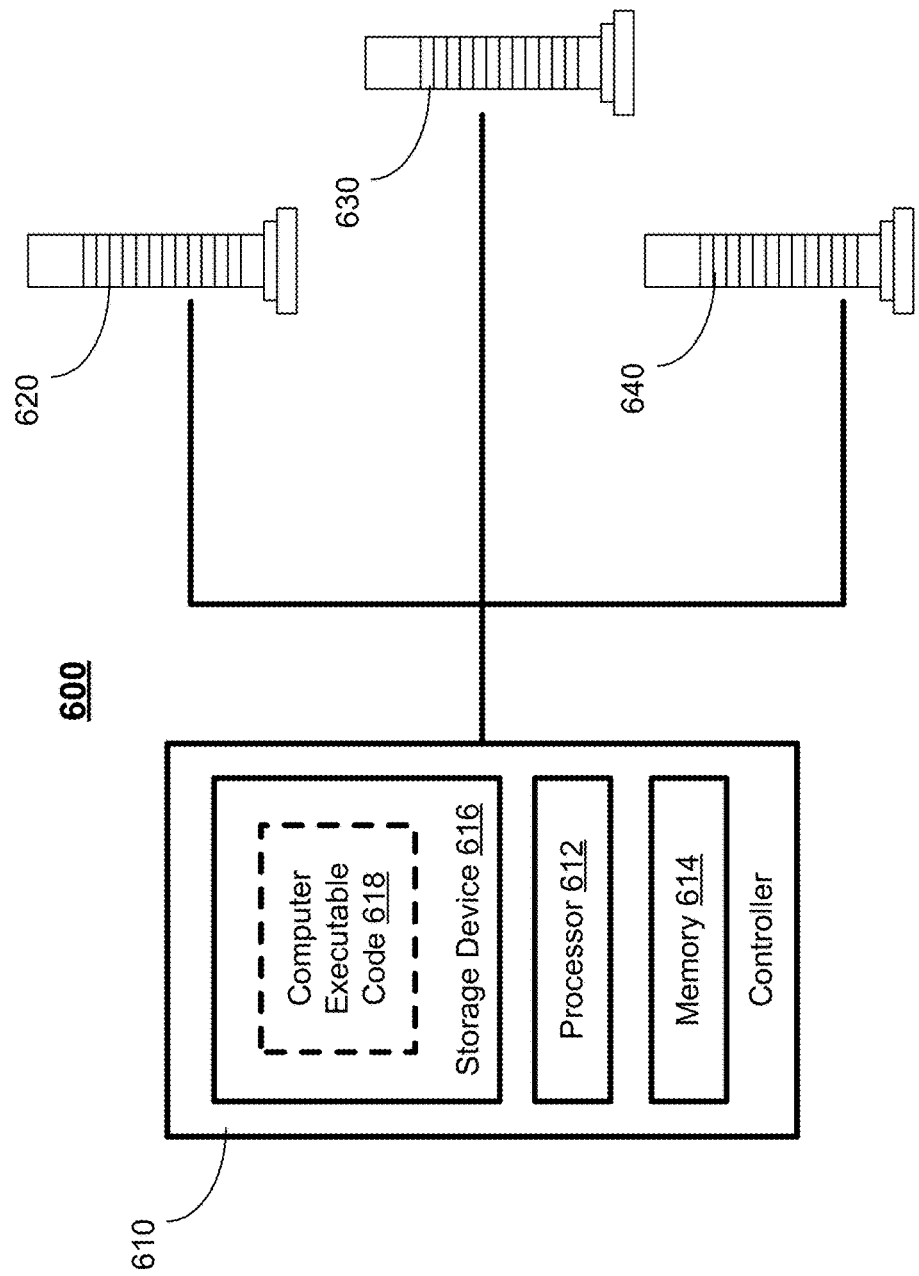
FIG. 6 is a schematic view of a robot system according to one embodiment of the present invention.

In another aspect of the present invention, a robot system may be provided. For example, FIG. 6 is a schematic view of a robot system according to one embodiment of the present invention. As shown in FIG. 6, the robot system 600 includes a controller 610, which is connected to one or multiple flexible suction devices 620, 630 and 640, so that the controller 610 may control each of the flexible suction devices 620, 630 and 640 to grasp an object. In certain embodiments, some or all of the flexible suction devices 620, 630 and 640 may have the structure as shown in FIGS. 2A-2C, or may have the structure as shown in FIG. 5.

In certain embodiments, the controller 610 as shown in FIG. 6 may be a computing device, which includes a processor 612, a memory 614, and a storage device 616 storing computer executable code 618.

The processor 612 controls operation of the controller 610. In certain embodiments, the processor 612 may be a central processing unit (CPU). The memory 614 may be a volatile memory, such as the random-access memory (RAM), for storing the data and information during the operation of the controller 610. In certain embodiments, the memory 614 may be a volatile memory array. In certain embodiments, the controller 610 may run on more than one processor 612 and/or more than one memory 114.

The storage device 616 is a non-volatile data storage media or device for storing the computer executable code 618 of the controller 610. Examples of the storage device 616 may include flash memory, memory cards, USB drives, or other types of non-volatile storage devices such as hard drives, floppy disks, optical drives, or any other types of data storage devices. In certain embodiments, the controller 110 may have more than one storage device 116.

The computer executable code 618 include the code or instructions which, when executed at the processor 612, may perform certain features to control the operation of the flexible suction device 620, 630 and 640. Examples of these features may include, without being limited thereto, controlling one of the flexible suction devices to grasp the object by the suction force or to release the object being grasped; controlling one of the flexible suction devices to switch to the straight state; controlling one of the flexible suction devices to switch to the at least one bending state; and controlling one of the flexible suction devices to move.

Figure 7:
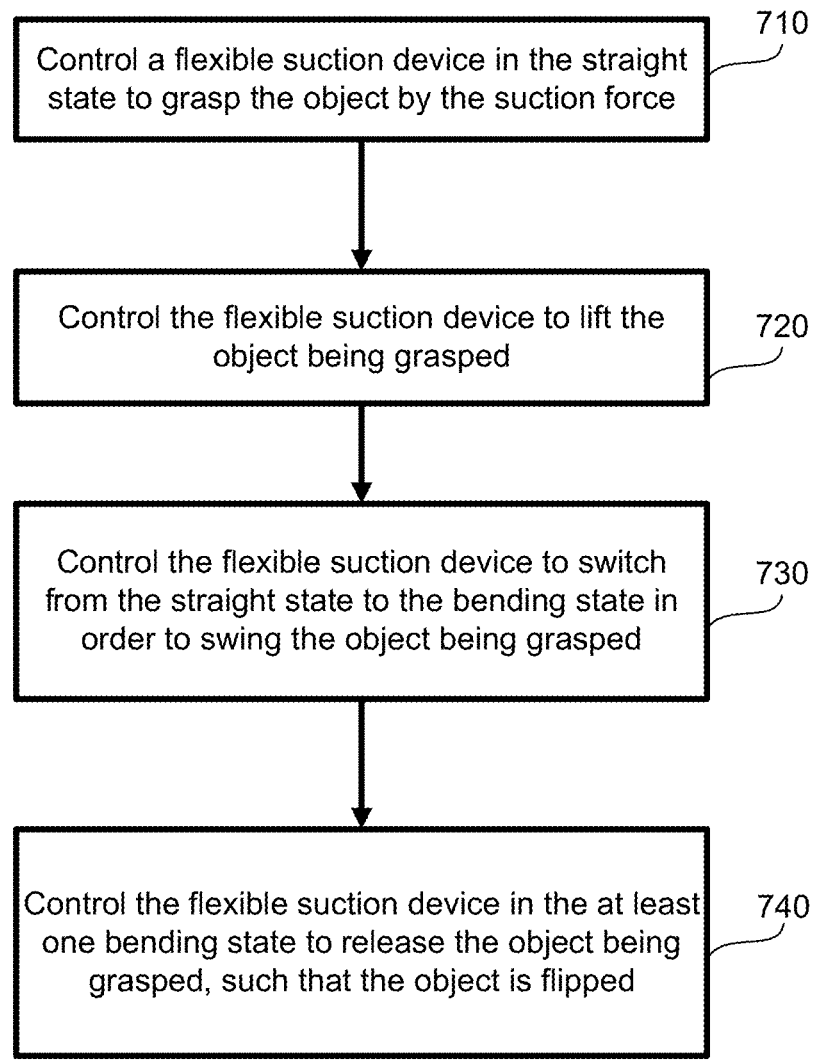
FIG. 7 is a flowchart showing a method of flipping an object using a flexible suction device of a robot system according to one embodiment of the present invention.

In certain embodiments, the robot system 600 as shown in FIG. 6 may be used to perform flipping of an object. For example, FIG. 7 is a flowchart showing a method of flipping an object using a flexible suction device of a robot system according to one embodiment of the present invention. In certain embodiments, the method as shown in FIG. 7 may be implemented on a robot system as shown in FIG. 6, which has multiple flexible suction devices. It should be particularly noted that, unless otherwise stated in the present invention, the steps of the method may be arranged in a different sequential order, and are thus not limited to the sequential order as shown in FIG. 7.

As shown in FIG. 7, when a robot system 600 as shown in FIG. 6 is provided, at procedure 710, the controller 610 may control one of the flexible suction devices in the straight state or a flexible state (the device can be bent due to the center of mass of the object being attached to) to grasp an object by the suction force. Then, at procedure 720, the controller 610 may control the flexible suction device to lift the object being grasped. Once the object is lifted, at procedure 730, the controller 610 may control the flexible suction device to switch from the straight state to the bending state in order to swing the object being grasped. Finally, at procedure 740, the controller 610 may control the flexible suction device to release the object, such that the object is flipped. In certain embodiments, the switch between the straight state and the bending states may be controlled actively by control devices such as strings. In other embodiments, the switch between the straight state and the bending states may be controlled passively by the mass of the object, and the moving speed, the moving acceleration, the moving angle etc. of the controller 610.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A robot system, comprising:
    a controller; and
    a plurality of flexible suction devices each being configured to grasp an object, wherein each of the flexible suction devices comprises:
        a flexible tube portion; and
        a suction cup connected to one end of the flexible tube portion, and configured to grasp the object by a suction force,
        wherein the flexible tube portion is switchable between a straight state and at least one bending state, such that the controller is configured to control the flexible tube portion to bend in the at least one bending state in order to swing and flip the object being grasped by the suction cup.

2. The robot system of claim 1, wherein the flexible tube portion comprises:
    a plurality of flexible sections flexibly connected to one another; and
    a plurality of strings, each penetrating a periphery of the flexible sections to control the flexible sections to switch between the straight state and the at least one bending state.

3. The robot system of claim 2, wherein an end of each of the strings is fixed to the suction cup.

4. The robot system of claim 2, wherein each of the flexible sections is a ring structure having a plurality of holes at the periphery thereof, and each of the strings penetrates through a corresponding one of the holes.

5. The robot system of claim 2, wherein the flexible tube portion comprises:
    a plurality of sections; and
    at least one joint structure connecting the plurality of sections to control one of the sections to rotate relatively to another of the sections.

6. The robot system of claim 1, wherein the controller comprises:
    a processor; and
    a storage device storing computer executable code,
    wherein the controller is configured to execute the computer executable code at the processor to perform:
        controlling one of the flexible suction devices to grasp the object by the suction force or to release the object being grasped;
        controlling one of the flexible suction devices to switch to the straight state;
        controlling one of the flexible suction devices to switch to the at least one bending state; and
        controlling one of the flexible suction devices to move.

7. The robot system of claim 6, wherein the controller is configured to flip the object by:
    controlling one of the flexible suction devices in the straight state to grasp the object by the suction force;
    controlling the flexible suction device to lift the object being grasped;
    controlling the flexible suction device to switch from the straight state to the at least one bending state in order to swing the object being grasped; and
    controlling the flexible suction device in the at least one bending state to release the object being grasped, such that the object is flipped.

8. The robot system of claim 7, wherein when the flexible suction device is in the straight state, a vertical projection of a center of mass of the object is located on a bottom surface of the object, and when the flexible suction device is switched to the at least one bending state, the vertical projection of the center of mass of the object is located on a different surface from the bottom surface of the object, such that the object is flipped when the flexible suction device releases the object.

9. A method of flipping an object using a robot system, comprising:
    providing a flexible suction device to the robot system, wherein the flexible suction device comprises:
        a flexible tube portion; and
        a suction cup connected to one end of the flexible tube portion, and configured to grasp the object by a suction force, wherein the flexible tube portion is switchable between a straight state and at least one bending state;
    controlling the flexible suction device in the straight state to grasp the object by the suction force;
    controlling the flexible suction device to lift the object being grasped;
    controlling the flexible suction device to switch from the straight state to the at least one bending state in order to swing the object being grasped; and
    controlling the flexible suction device in the at least one bending state to release the object being grasped, such that the object is flipped.

10. The method of claim 9, wherein the flexible tube portion comprises:
    a plurality of flexible sections flexibly connected to one another; and
    a plurality of strings, each penetrating a periphery of the flexible sections to control the flexible sections to switch between the straight state and the at least one bending state.

11. The method of claim 10, wherein an end of each of the strings is fixed to the suction cup.

12. The method of claim 10, wherein each of the flexible sections is a ring structure having a plurality of holes at the periphery thereof, and each of the strings penetrates through a corresponding one of the holes.

13. The method of claim 9, wherein the flexible tube portion comprises:
    a plurality of sections; and
    at least one joint structure connecting the plurality of sections to control one of the sections to rotate relatively to another of the sections.

14. The method of claim 9, wherein the robot system comprises a controller, and
    the controller comprises:

a processor; and a storage device storing computer executable code, wherein the controller is configured to execute the computer executable code at the processor to perform:

controlling the flexible suction devices to grasp the object by the suction force or to release the object being grasped;

controlling the flexible suction device to switch to the straight state;

controlling the flexible suction device to switch to the at least one bending state; and controlling the flexible suction devices to move.

15. The method of claim 9, wherein when the flexible suction device is in the straight state, a vertical projection of a center of mass of the object is located on a bottom surface of the object, and when the flexible suction device is switched to the at least one bending state, the vertical projection of the center of mass of the object is located on a different surface from the bottom surface of the object, such that the object is flipped when the flexible suction device releases the object.

* * * * *